United States Patent
Brindeau et al.

(10) Patent No.: US 11,091,277 B1
(45) Date of Patent: Aug. 17, 2021

(54) METHOD FOR ASSEMBLING A CENTRAL AIRCRAFT FUSELAGE SECTION ON A TROLLEY

(71) Applicants: Airbus (S.A.S.), Blagnac (FR); Airbus Operations (S.A.S.), Toulouse (FR)

(72) Inventors: Jean-Mickael Brindeau, Blagnac (FR); Jean-Marc Datas, Toulouse (FR); Nicolas Darbonville, Blagnac (FR)

(73) Assignees: Airbus (S.A.S.), Blagnac (FR); Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 17/159,685

(22) Filed: Jan. 27, 2021

(30) Foreign Application Priority Data

Jan. 28, 2020 (FR) .................................... 2000804

(51) Int. Cl.
*B64F 5/10* (2017.01)
*B64F 5/50* (2017.01)
*B23P 19/10* (2006.01)

(52) U.S. Cl.
CPC .............. *B64F 5/10* (2017.01); *B23P 19/10* (2013.01); *B64F 5/50* (2017.01); *B23P 2700/01* (2013.01)

(58) Field of Classification Search
USPC .......... 220/1.5, 4, 10, 83, 84, 23.6, 71, 350; 414/505, 532; 198/597, 592, 463.3; 206/509; 160/120; 244/137, 1 R, 136, 244/118.1, 118.2
See application file for complete search history.

(56) References Cited

U.S. PATENT DOCUMENTS

| | | | |
|---|---|---|---|
| 4,945,488 A * | 7/1990 | Carver | G05B 19/41805 700/182 |
| 6,517,028 B2 * | 2/2003 | Huber | B64D 9/00 244/118.1 |
| 9,868,549 B2 * | 1/2018 | Frauen | B64C 1/26 |
| 2006/0118235 A1 | 6/2006 | Lum et al. | |
| 2015/0083860 A1 * | 3/2015 | Frauen | B64F 5/10 244/119 |
| 2019/0388959 A1 | 12/2019 | Oberoi et al. | |
| 2020/0094991 A1 * | 3/2020 | Datas | B23K 37/0426 |

FOREIGN PATENT DOCUMENTS

| | | |
|---|---|---|
| CN | 104 097 789 B | 12/2015 |
| DE | 20 2017 105281 U1 | 9/2017 |

OTHER PUBLICATIONS

French Search Report for Application No. 2000804 dated Oct. 13, 2020.

* cited by examiner

*Primary Examiner* — Lawrence Averick
(74) *Attorney, Agent, or Firm* — Jenkins, Wilson, Taylor & Hunt, P.A.

(57) ABSTRACT

An assembly of a central aircraft fuselage section includes a longitudinal master wall for fixing of two aircraft air foil boxes. The method includes providing a trolley that can be moved on the ground, including a supporting structure in a station, supplying the station with the master wall, installing and mechanically immobilizing the master wall at a reference position on the supporting structure of the trolley, supplying the station with a transverse wall, installing and mechanically immobilizing this transverse wall at a reference position situated at a rectilinear edge upstream or downstream of the master wall, fixing the transverse wall to the master wall, and moving the trolley to another station.

11 Claims, 6 Drawing Sheets

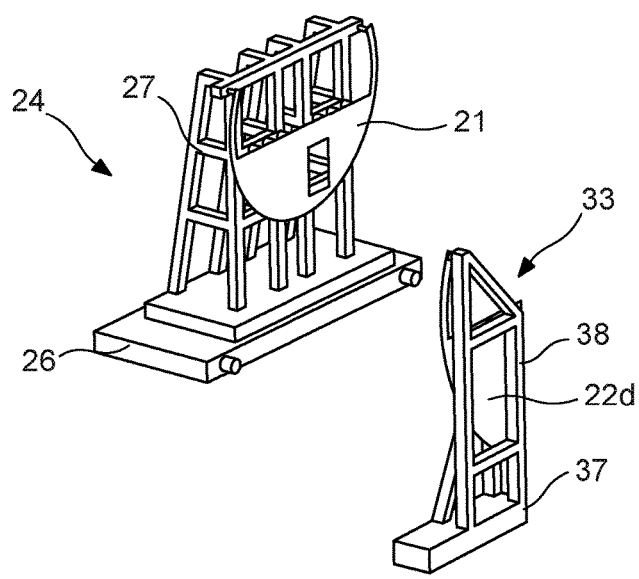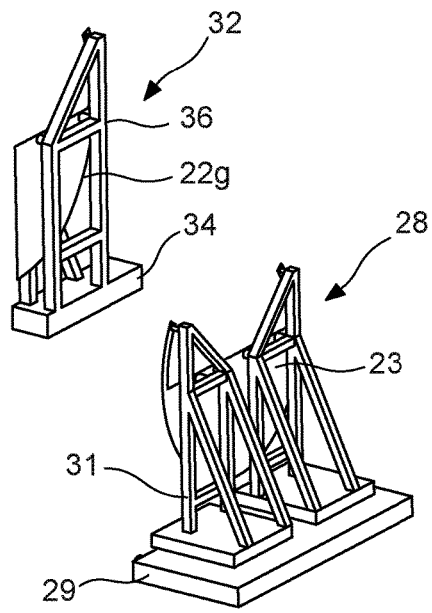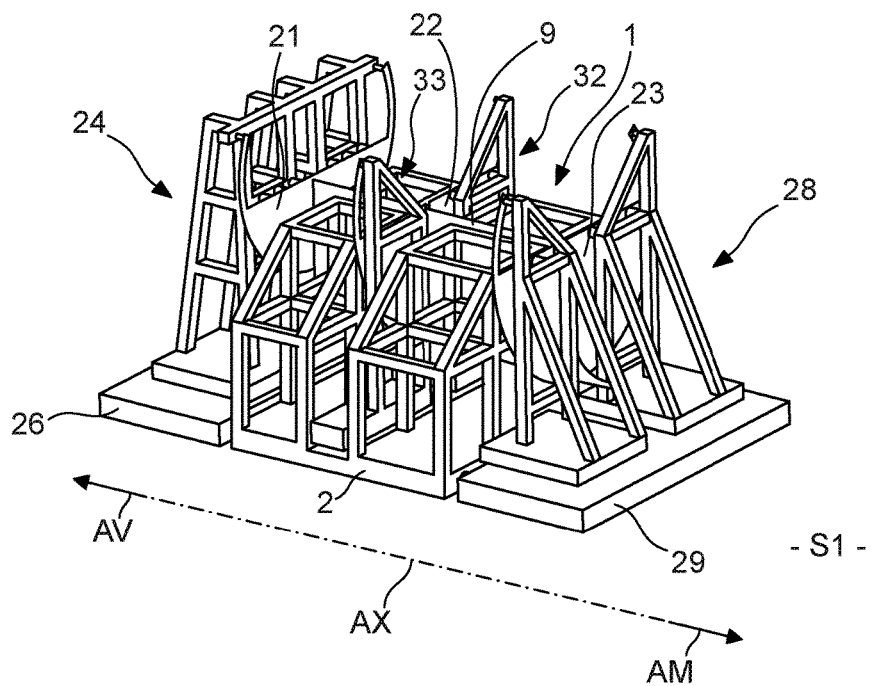

METHOD FOR ASSEMBLING A CENTRAL AIRCRAFT FUSELAGE SECTION ON A TROLLEY

CROSS-REFERENCE TO RELATED APPLICATION

This application claims priority to French Patent Application FR 2000804 filed Jan. 28, 2020, the entire disclosure of which is incorporated by reference herein.

TECHNICAL FIELD

The disclosure herein relates to the assembly and the production of a central aircraft fuselage section intended notably to receive two main wings to support them.

BACKGROUND

The fuselage of an aircraft comprises various substantially cylindrical sections which are assembled individually before being fixed to one another.

Assembling such a section notably requires positioning elements that make up its framework, making them conform geometrically, adding and fixing reinforcing elements to this framework, to then be able to add the outer skin onto the duly constructed framework in order to fix it thereon.

These operations require the observance of a set of imperatives, notably in terms of geometrical conformity of the elements to be assembled, which are highly restrictive. In the case of a commercial aircraft, such a fuselage section has significant dimensions, such that the assembly requires handling plant and components, which also have significant dimensions, in addition to having to be positioned precisely with respect to one another.

In this context, the known installations for assembling such a fuselage are generally complex and take up a lot of space.

An aim of the disclosure herein is to provide a solution that makes it possible to simplify the installations and toolages necessary to the assembly of such a fuselage section.

SUMMARY

To this end, the subject of the disclosure herein is a method for assembling a central aircraft fuselage section, this section comprising a longitudinal master wall intended for the fixing of two wing boxes of the aircraft, this method comprising the steps of:
  supplying a trolley that can move around on the ground, comprising a supporting structure and positioning this trolley in an assembly station;
  providing the station with the master wall, installing and mechanically immobilizing the master wall in a reference position on the supporting structure of the trolley;
  providing the station with a transverse wall, installing and mechanically immobilizing this transverse wall in a reference position with respect to the trolley, in which the transverse wall is situated with respect to the master wall in position to be secured with this master wall;
  fixing the transverse wall to the master wall;
  moving the trolley to another assembly station.

The disclosure herein makes it possible to ensure the assembly of the central fuselage part by exploiting the lower wing root region of this section, which comprises a longitudinal master wall that makes it possible to both form and support the assembly throughout its construction. The assembly can thus be moved from one station to another without lifting plant, by simply rolling the trolley which supports it on the ground.

The disclosure herein relates also to a duly defined method, in which the station is provided with a transverse wall borne by a traveling gantry crane to which this transverse wall is fixed, and in which the installation and the mechanical immobilization of this transverse wall in a reference position are assured by placing and by immobilizing the traveling gantry crane in a predetermined position with respect to the trolley.

The disclosure herein relates also to a duly defined method, comprising the steps of:
  providing the station with a left part of a median transverse wall, installing and mechanically immobilizing this left part in a reference position, in which it extends at right angles to the longitudinal master wall substantially at mid-length of this longitudinal master wall by having an internal edge running along a left face of this longitudinal master wall;
  fixing the left part to the longitudinal master wall;
  providing the station with a right part of a median transverse wall, installing and mechanically immobilizing this right part in a reference position, in which it extends at right angles to the longitudinal master wall substantially at mid-length of this longitudinal master wall by having an internal edge running along the left face of this longitudinal master wall;
  fixing the right part to the longitudinal master wall;
  moving the trolley to another assembly station.

The disclosure herein relates also to a duly defined method, comprising the steps of:
  positioning the trolley in an assembly station;
  providing this station with a left spar and a right spar, installing and mechanically immobilizing each spar in a reference position with respect to the trolley, in which each spar bears an upper edge of each transverse wall;
  fixing each spar to the transverse walls;
  moving the trolley to another assembly station.

The disclosure herein relates also to a duly defined method, comprising the steps of:
  providing the assembly station with a left apron and a right apron, installing and mechanically immobilizing each apron in a reference position with respect to the trolley, in which each apron extends along a spar between two transverse walls;
  fixing each apron to a spar and to at least one transverse wall.

The disclosure herein relates also to a duly defined method, comprising the steps of:
  positioning the trolley in an assembly station;
  providing the assembly station with cross-beams, installing and mechanically immobilizing each cross-beam in a reference position with respect to the trolley, each cross-beam extending from one spar to the other when it is in its reference position;
  fixing each cross-beam to the spars;
  moving the trolley to another station.

The disclosure herein relates also to a duly defined method, comprising the steps of:
  providing the assembly station with transverse girders, installing and mechanically immobilizing each girder in a reference position with respect to the trolley, each girder extending from one spar to the other when it is in its reference position;
  fixing each girder to the spars;
  moving the trolley to another station.

The disclosure herein relates also to a duly defined method, comprising the steps of:

provisioning the trolley in an assembly station;

providing the station with a substantially semicylindrical downstream lower portion of fuselage skin, and positioning and immobilizing this downstream lower portion in a reference position with respect to the trolley, the downstream lower portion extending downstream from a transverse wall in the reference position, this downstream lower portion comprising two upper rectilinear edges extending in the extension of the spars when it is in its reference position;

providing the station with a substantially semicylindrical upstream lower portion of fuselage skin, and positioning and immobilizing this upstream lower portion in a reference position with respect to the trolley, the upstream lower portion extending upstream from a transverse wall in the reference position, this upstream lower portion comprising two upper rectilinear edges extending in the extension of the spars when it is in its reference position;

providing the station with a substantially semicylindrical upper portion of fuselage skin, and positioning and immobilizing this upper portion in a reference position with respect to the trolley, the upper portion extending above the downstream lower portion and above the upstream lower portion so as to form a substantially cylindrical assembly in the reference position, this upper portion comprising two lower rectilinear edges extending in the extension of the spars by being contiguous with the upper edges of the upstream and downstream lower portions in the reference position;

fixing the upper edges of the upstream and downstream lower portions to the lower edges of the upper portion.

The disclosure herein relates also to a duly defined method, in which the fixings are assured by bolting, riveting, welding, bonding, polymerization or the like.

The disclosure herein relates also to a duly defined method, in which a mobile trolley of rolling type with motorized wheels is used.

The disclosure herein relates also to a duly defined method, in which guiding rails are provided fixed to the ground to control the movements of the trolley.

BRIEF DESCRIPTION OF THE DRAWINGS

FIG. 5 is an overview of a downstream traveling gantry crane bearing a downstream wall according to the disclosure herein;

FIG. 6 is an overview of an upstream traveling gantry crane bearing an upstream wall according to the disclosure herein;

FIG. 7 is an overview of a left gantry crane bearing a left part of a median wall according to the disclosure herein;

FIG. 8 is an overview of a right gantry crane bearing a right part of a median wall according to the disclosure herein;

FIG. 9 is an overview of the trolley according to the disclosure herein when the upstream, downstream, left and right traveling gantry cranes are in position for the fixing of the downstream, median and upstream walls to the master wall;

DETAILED DESCRIPTION

Figure 1:
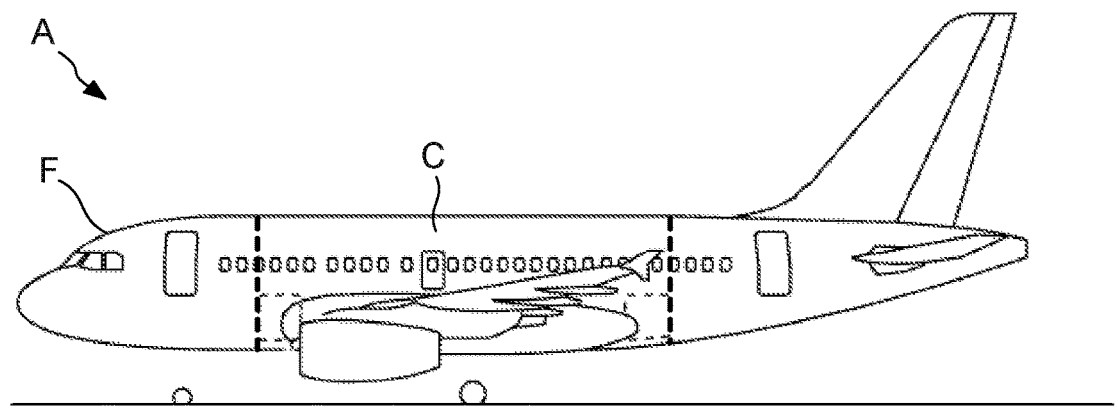
FIG. 1 is a side view of an aircraft as a whole.

In FIG. 1, an aircraft A comprises a generally cylindrical fuselage F including a central section C supporting two wings extending horizontally on either side of this fuselage.

The idea on which the disclosure herein is based is to ensure the assembly of the central fuselage section by exploiting the lower wing root region of this section to jointly form and support the assembly throughout its construction, so as to be able to move it without lifting plant, by simply rolling the trolley on the ground.

To this end, the longitudinal master wall is used, this wall forming an integral part of the fuselage section, and which extends in the central part of the wing root region that it separates into two parts, this master wall constituting an element that makes it possible on the one hand to support the assembly, and on the other hand to receive the various components to make up the framework then the fuselage section as a whole.

Trolley

Figure 2:
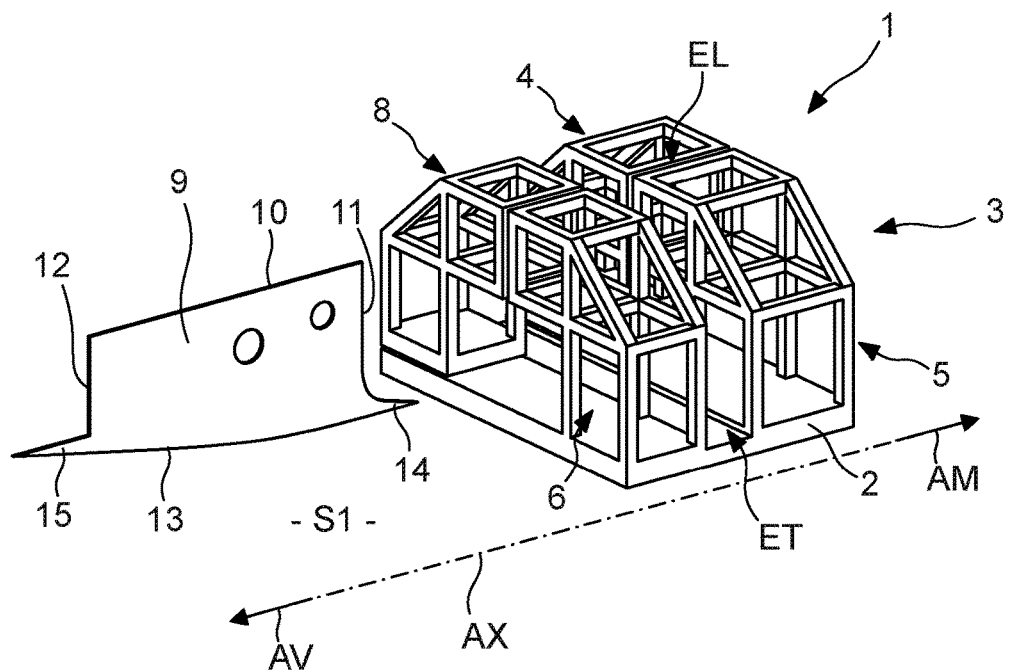
FIG. 2 is an overview showing the trolley according to the disclosure herein with the master wall of an aircraft fuselage section.
Figure 3:
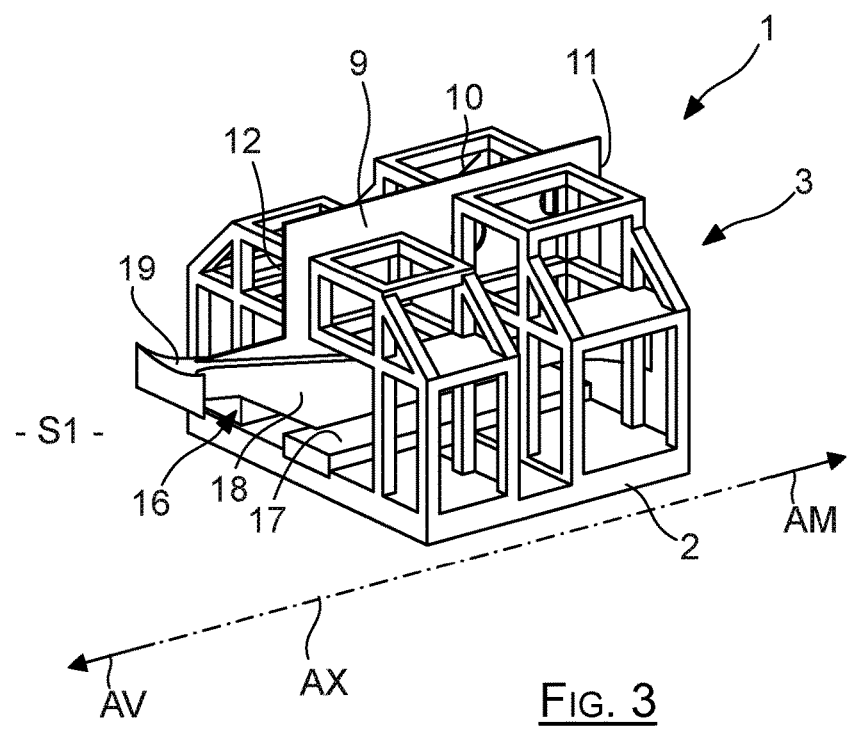
FIG. 3 is an overview showing the trolley according to the disclosure herein in which the master wall is installed bearing on a template.

In FIG. 2, a trolley 1 according to the disclosure herein comprises a rolling bed-plate 2 having a substantially rectangular outline on which there is mounted a fixed supporting structure 3. This trolley 1 is a rolling trolley to be able to move around on the ground in a main direction AX parallel to the longitudinal direction of a fuselage section intended to be assembled on this trolley 1.

The supporting structure 3 comprises a left upstream module 4, a right upstream module 5, a left downstream module 7, and a right downstream module 6, the upstream AM and the downstream AV corresponding to the front and the rear of the fuselage section in accordance with the direction of movement of the aircraft in flight, and, likewise, the left and the right correspond to the left and the right of the fuselage section. As can be seen in FIG. 2, each module is a mechanically welded tubular element, comprising a base fixed to the bed-plate and supporting a head spaced apart from the bed-plate.

The two upstream modules 4 and 5 are spaced apart longitudinally from the two downstream modules 6 and 7 to delimit therewith a transverse space ET running the entire width of the trolley, from left to right, by extending at right angles to the bed-plate 2. This transverse space ET is intended to receive and support a transverse wall of the fuselage section.

The two left modules 4 and 8 are laterally spaced apart from the right modules 5 and 6, so as to delimit between them a central longitudinal space EL running along the trolley from upstream to downstream by extending at right angles to the bed-plate. This longitudinal space EL is intended to receive and support a master wall 9 of the fuselage section.

Station S1—Assembling the Walls

Figure 4:
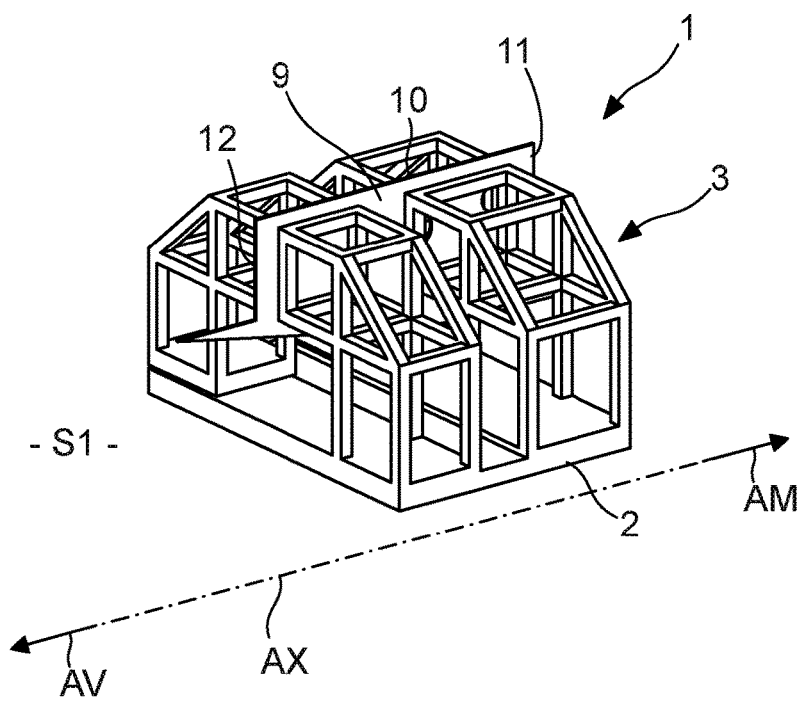
FIG. 4 is an overview showing the trolley according to the disclosure herein in which the master wall is installed after removal of the template.

The master wall 9 has a generally substantially rectangular form, comprising a rectilinear upper edge 10 extended by a rectilinear upstream edge 11, by a rectilinear downstream edge 12 and a lower edge 13 of domed form. The ends of this lower edge 13 extend beyond the upstream and downstream edges and correspond respectively to an upstream spur 14 and a downstream spur 15 extending longitudinally beyond the trolley when the wall 9 is in place in the longitudinal space EL as in FIG. 4.

When the master wall 9 is in situation, its upper edge extends horizontally, parallel to the ground, and its upstream 11 and downstream 12 edges extend vertically with respect to the ground, which is the case in the situations illustrated in the various figures.

The placing of the master wall 9 in the longitudinal space EL of the trolley is advantageously done with a template 16 comprising a flat base 17 supporting a rib 18 terminated by an upper edge supporting a gutter 19 whose profile corresponds to the curvature of the lower edge 13.

This template 16 can be installed temporarily on the bed-plate 2 between the right modules 5, 6 and the left modules 4, 8, in the longitudinal space EL, to receive the lower edge 13 of the master wall 9, which allows it to be positioned vertically with respect to the bed-plate 2, and possibly longitudinally with respect to the latter.

Complementing this, the structure 3 is equipped with mechanical positioning elements, of bearing, locating or similar mechanical stop types, ensuring that the installation of the wall 9 in the longitudinal space EL ensures a precise positioning thereof on the trolley.

When the master wall 9 is in position in the longitudinal space EL, gripping elements with which the structure 3 is equipped are actuated to immobilize the wall 9 firmly in its reference position, after which the template 16 can be removed, for example by moving it longitudinally downstream AV with respect to the bed-plate 2 to remove it therefrom.

Once the wall 9 is in place and held on the trolley, a downstream transverse wall 21, a median transverse wall 22, and an upstream transverse wall 23 are added transversely to the supporting structure 3 to be secured to the master wall 9 so as to constitute a central framework portion of the fuselage section.

As can be seen in FIG. 5, the downstream wall is installed first on a downstream traveling gantry crane 24, which comprises a bed-plate 26 equipped with a supporting structure 27 provided with appropriate positioning elements, such as mechanical stops and seats.

After having checked the geometrical conformity of the positioning of the downstream wall 21 on the structure 27 and the immobilizing thereof on this structure, the downstream gantry crane 24 is moved up to the downstream face of the trolley 1. At this state and as illustrated in FIG. 9, the bed-plate 26 of the gantry crane is placed facing the bed-plate 2 of the trolley 1, so that the positioning of the downstream wall 21 correlates with that of the master wall 9. The downstream wall 21 then extends at right angles to the ground and to the master wall 9, and its upstream face has its central portion bearing on the downstream edge of the master wall 9. The upper edge of the downstream wall 21 is then at the same distance from the ground as the upper edge of the master wall 9.

As illustrated in FIG. 9, when the master wall 9 is in position in the trolley 1 and the downstream wall 21 is in position on the downstream gantry crane 24, the act of bringing the downstream gantry crane 24 to the downstream face of the trolley, and of placing its bed-plate 26 in line with the bed-plate 2 of the trolley, sufficient to position the downstream wall 21 in geometrical conformity with the master wall 9 in order for it to be secured to this master wall.

To this end, the bed-plates 2 and 26 are advantageously equipped with mechanical guides, of block or similar type ensuring a precise positioning of the downstream gantry crane 24 with respect to the trolley 1, when the downstream face of the bed-plate 26 of the gantry crane 24 is pressed against the downstream face of the bed-plate 2 of the trolley.

The downstream wall 21 can then be fixed to the downstream edge 12 of the master wall 9. Depending on the materials present, the fixing is ensured by bolting, riveting, welding, bonding, polymerization, or any other appropriate fixing structure. Once this fixing is done, the downstream wall 21 is released, that is to say released from the supporting structure 27, to allow the removal of the downstream gantry crane 24.

Similarly, and as illustrated in FIG. 6, the upstream wall 23 is first of all installed on an upstream traveling gantry crane 28, comprising a bed-plate 29 supporting a structure 31 receiving this upstream wall 23. Similarly, after checking the geometrical conformity of the positioning of the upstream wall 23 and the immobilization of this wall on the structure 31, this gantry crane is brought to the upstream face of the trolley 1 to place its bed-plate 29 in line with the bed-plate 2 of the trolley, which is sufficient to position the upstream wall 23 in line with the upstream edge 11 of the wall 9 supported by the trolley 1, as represented in FIG. 9.

In this situation, the central region of the upstream wall 23 is bearing on the upstream edge of the wall 9, and the upper edge of the upstream wall 23 is at the same height as the upper edge of the master wall 9, the upstream wall extending at right angles to the ground and to the master wall 9.

Just as in the case of the downstream gantry crane 24, the act of bringing the upstream gantry crane 28 to the upstream face of the trolley 1, and of placing its bed-plate 29 in line with the bed-plate 2 of the trolley, is sufficient to place the upstream wall 23 in geometrical conformity with the master wall 9.

To this end, the bed-plates 2 and 29 are advantageously equipped with mechanical guides, of locating stop block or similar type ensuring a precise positioning of the upstream gantry crane 28 with respect to the trolley 1, when the downstream face of the bed-plate 29 of the gantry crane 28 is pressed against the upstream face of the bed-plate 2 of the trolley.

The upstream wall 23 can then be fixed to the upstream edge of the wall 9 in the same way as for the fixing of the downstream wall 21. Once this fixing is done, the upstream wall 23 is released, that is to say released from its supporting structure 31, to allow the removal of the upstream gantry crane 28.

The median wall is formed initially by a left part 22g installed on a left gantry crane 32, as represented in FIG. 7 and a right part 22d supported by a right gantry crane 33 represented in FIG. 8.

The left gantry crane 32 comprises a bed-plate 34 equipped with a structure 36 on which the left part 22g is installed, by being positioned thereon and immobilized in geometrical conformity with this gantry crane. When the left part 22g is in place on the structure 36, the left gantry crane 32 can be moved to be installed on the bed-plate 2 of the trolley, in the left part of the transverse space ET, so as to place an internal edge of the left part 22g against the left face of the master wall 9, in order to proceed with the fixing thereof.

Positioning elements of mechanical stop and other types are advantageously provided to ensure a precise placement of the left gantry crane in the transverse space ET, that is to say a placing of the left part 22g in geometrical conformity with respect to the master wall 9 when the left gantry crane is in place in the transverse space ET of the trolley.

After assembly, the left part 22g is released from the structure 36 which supports it, in order to allow the removal of the left gantry crane 32.

Similarly, the right gantry crane 33 comprises a bed-plate 37 equipped with a structure 38 on which the right part 22d is installed, by being positioned thereon and immobilized in geometrical conformity with this gantry crane. When the right part 22d is in place on the structure 38, the right gantry crane 33 can be moved to be installed on the bed-plate 2 of the trolley, in the right part of the transverse space ET, so as to place an internal edge of the right part 22d against the right face of the master wall 9, to fix it to this master wall.

Positioning elements of mechanical stop and other types are advantageously provided to ensure a precise placement of the right gantry crane in the transverse space ET, that is to say a placing of the right part 22d in geometrical conformity with respect to the master wall 9 when the right gantry crane is in place in the transverse space ET of the trolley.

After assembly, the right part 22d is mechanically released from the structure 38 which supports it, in order to allow the removal of the right gantry crane 33.

Figure 14:
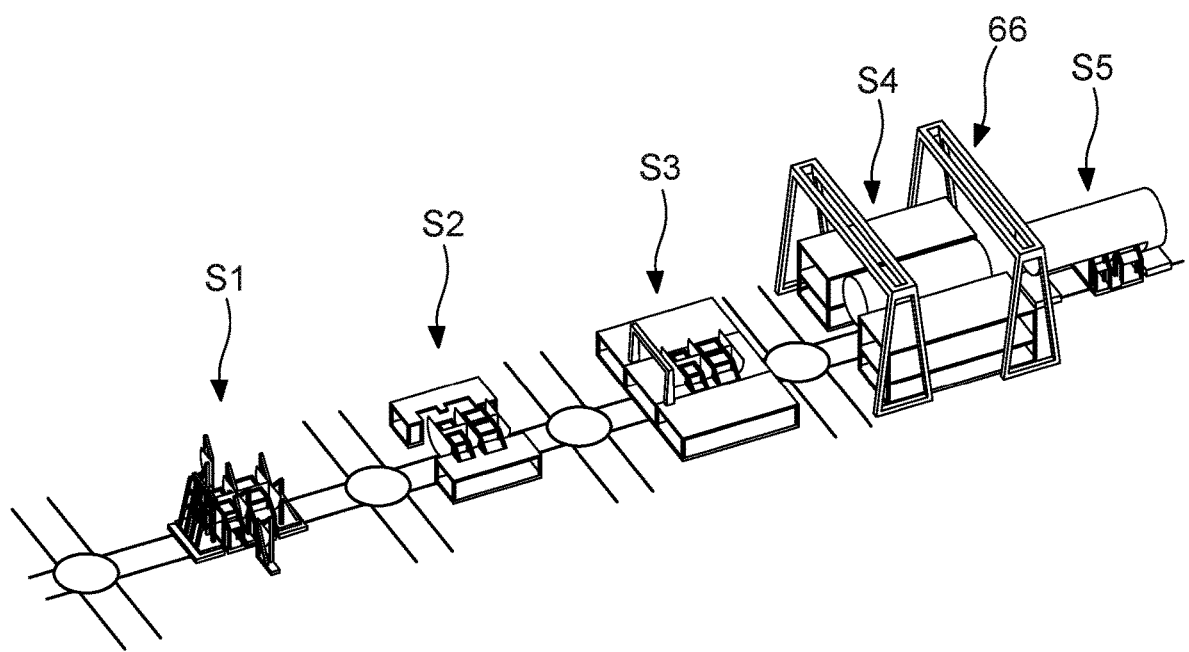
FIG. 14 is an overview of the stations that can be occupied by the trolley in the assembly installation according to the disclosure herein.

Generally, all of these operations, namely the installation of the master wall 9 in the supporting structure 3, the positioning and the assembly of the downstream wall 21, of the median wall 22, and of the upstream wall 23, are performed directly on the trolley 1 immobilized in a first station with the reference S1 in FIG. 14.

During these operations, after installation of the master wall in the supporting structure of the trolley, the upstream, downstream, left and right traveling gantry cranes, loaded with their respective walls, are brought to and positioned with respect to the immobile trolley, before proceeding with the fixing of these walls to the master wall.

Once these various assembly operations have been carried out, the various gantry cranes and plant items are separated from the trolley 1 in order to free up its environment to allow it to move to a second assembly station with the reference S2 in FIG. 14.

Station S2—Spars and Aprons

The second station S2 allows for the addition, the positioning and the fixing of two spars and two additional aprons to the framework consisting of the assembly of the walls constructed in the first station S1.

Figure 10:
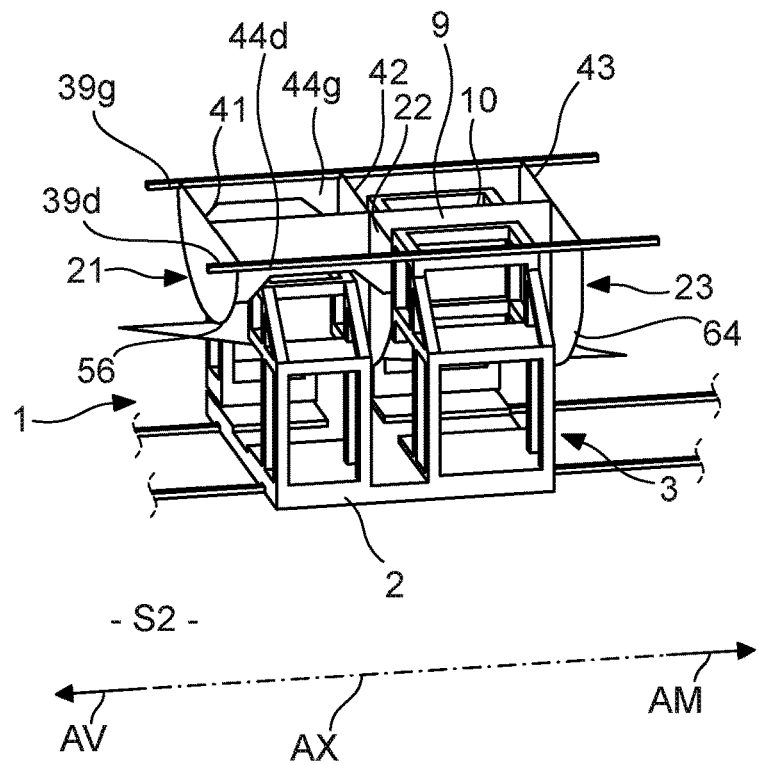
FIG. 10 is an overview of the trolley according to the disclosure herein upon the provisioning and fixing of spars and of lateral aprons to the transverse walls.
Figure 11:
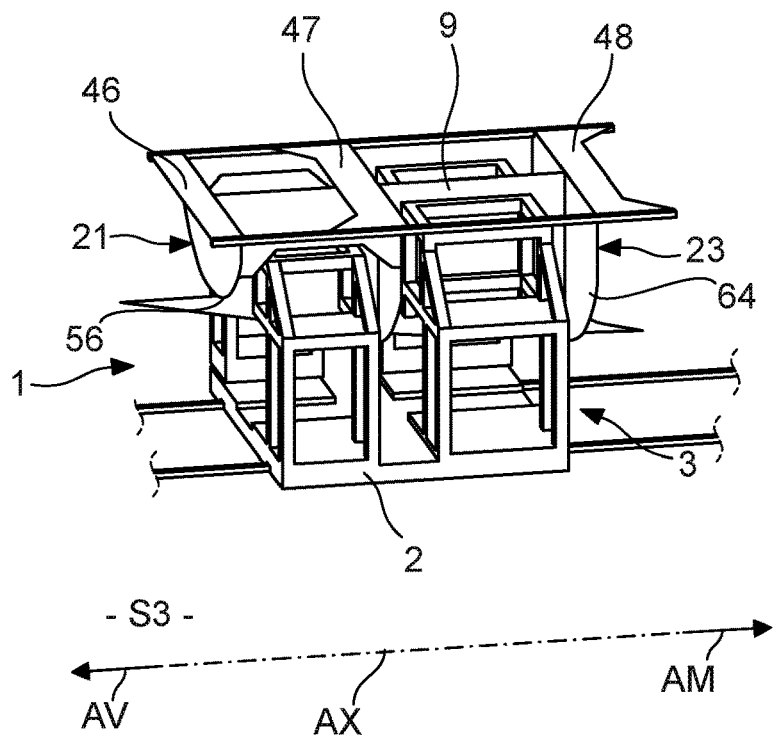
FIG. 11 is an overview of the trolley according to the disclosure herein upon the provisioning and the fixing of cross-beams to the framework that it supports.

As illustrated in FIG. 10, a left spar 39g is put in position, bearing on the left ends of the upper edges of the downstream 21, median 22 and upstream 23 walls, these upper edges being respectively identified by the references 41, 42 and 43. A right spar 39d is then put in position, bearing on the right ends of the upper edges. Advantageously, the ends of these upper edges 41, 42, 43 are provided with notches or the like allowing the positioning thereof.

As can be seen in FIG. 10, the upper edges 41, 42 and 43 of these walls, and the upper edge 10 of the master wall 9, extend horizontally by being at the same height level with respect to the ground, this height level corresponding substantially to the placement of the floor of the fuselage section. In these conditions, the spars 39g and 39d extend parallel to the direction AX.

The spars 39g and 39d are put in place with precision, the supporting structure 3 being advantageously provided with mechanical stops and seats and other structure for placing the spars in precise geometrical conformity with respect to the upper edges of the walls 9, 21, 22, 23. These can even be visual markers provided on the supporting structure, physical elements for immobilizing in position, or the like.

Complementing this, a left apron 44g is positioned in the left part of the structure 3, so as to run along the left spar 39g, under the latter, extending from the left edge of the downstream wall 21 to the left edge of the median wall 22. The apron 44g is essentially a wall of small thickness that has an essentially rectangular outline with a long edge that is scalloped so that it can be brought up to the opposite long edge which is rectilinear. The length of the long edges of the apron 44g corresponds to the distance separating the downstream wall 21 from the median wall 22.

As can be seen in FIG. 10, the apron 44g is positioned so that its short edges are connected respectively to an upper portion of the left edge of the downstream wall 21 and to an upper portion of the left edge of the median wall 22, while its upper long edge runs along the downstream portion of the left spar 39g.

Similarly, a right apron 44d is positioned in the right part of the structure 3, to run along the downstream portion of the right spar 39d while extending from an upper portion of the right edge of the downstream wall 21 to an upper portion of the right edge of the median wall 22. This right apron 44d has a form and outline that are symmetrical to those of the left apron 44g.

Just as for the positioning steps in the first station S1, the spars and aprons are placed on the structure 3 with sufficient precision before being immobilized in position, the structure 3 being advantageously equipped with immobilizing and/or position controls.

After having been installed, the spars are fixed to the walls, and the aprons are fixed to the walls and to the spars.

The various operations of provision of the spars and aprons, of positioning and of fixing of these elements, are handled manually, semi-automatically or automatically, with structure not visible in the figure(s) which equip the second station S2.

After the spars and aprons have been fixed, the various plant items of the station S2 are moved away from the trolley 1 so as to allow its transfer to another station identified by the reference S3.

Station S3—Cross-Beams

The station S3 allows the installation and the fixing of three additional cross-beams on the assembly to complete the floor framework.

As can be seen in FIG. 10, this step comprises the installation and the fixing of a downstream cross-beam 46, of a median cross-beam 47 and of an upstream cross-beam 48 to form the framework of the floor, these cross-beams being flat elements installed and fixed in a plane coinciding substantially with the plane of the spars 39g and 39d.

The downstream cross-beam 46, which has a flat wall form with rectangular outline, is installed horizontally to extend transversely from the downstream end of the left spar 39g to the downstream end of the right spar 39d. It thus has a short edge coinciding with the left spar 39g, an opposite short edge coinciding with the right spar 39d, and a long edge running along the upper edge 41 of the downstream wall 21, this cross-beam being horizontally downstream of the downstream wall 21 that it extends.

Once in place, the cross-beam is mechanically immobilized on the supporting structure 3, then each short edge of the cross-beam 46 is fixed to a corresponding spar and it is fixed by its upstream long edge to the upper edge of the downstream wall 21.

Similarly, the median cross-beam 47 and the upstream cross-beam 48 are placed on the supporting structure according to a precise positioning before being immobilized in position on this structure. The median cross-beam 47 has a rectangular outline with a long edge that is scalloped to be brought up to the opposite long edge which is rectilinear.

After the cross-beam 47 has been mechanically immobilized on the structure 3, each short edge of this cross-beam 47 is fixed to a spar, and its rectilinear upstream long edge is fixed to the upper edge 42 of the median wall 22, this cross-beam extending horizontally downstream of the median wall 22 that it extends.

The upstream cross-beam 48 has a form and an outline that are identical to the cross-beam 47 while having an opposite orientation. After mechanical immobilization on the structure 3 in the appropriate position, it is fixed by each of its short edges to a spar and by its downstream rectilinear long edge to the upstream wall 23, this cross-beam extending horizontally upstream of the upstream wall that it extends. This fixing is ensured, here again, depending on the situation, by bolting, riveting, welding, bonding, polymerization or the like.

Figure 12:
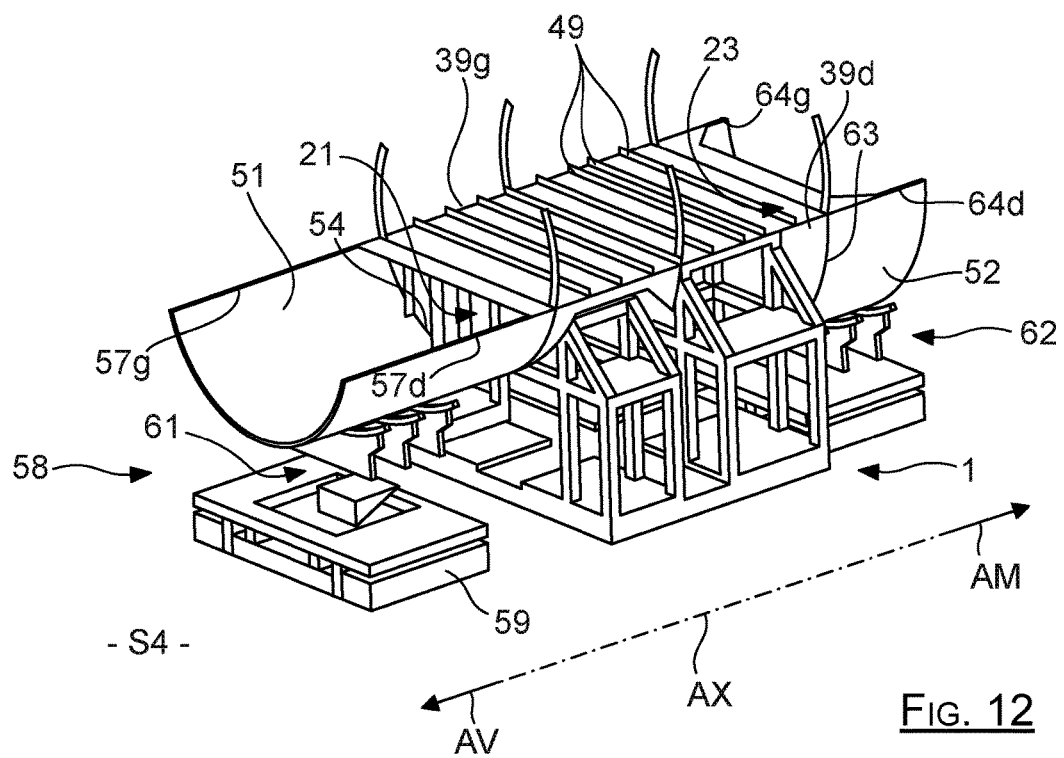
FIG. 12 is an overview of the trolley according to the disclosure herein upon the addition of a downstream lower portion of fuselage skin and of an upstream lower portion of fuselage skin.

Similarly, a set of transverse girders are installed and fixed by their ends to the spars. These transverse girders, identified by the reference 49 in FIG. 12, are regularly spaced apart from one another along the longitudinal direction while extending at right angles to this direction.

When the cross-beams have been installed and fixed, the various plant items of the station S3 are moved away from the trolley 1 to allow it to be moved to the station S4.

Station S4—Fuselage Skin

The station S5 allows for the installation and fixing of the skin of the fuselage to the framework assembly formed by the components which have been assembled on the stations S1 to S3.

Figure 13:
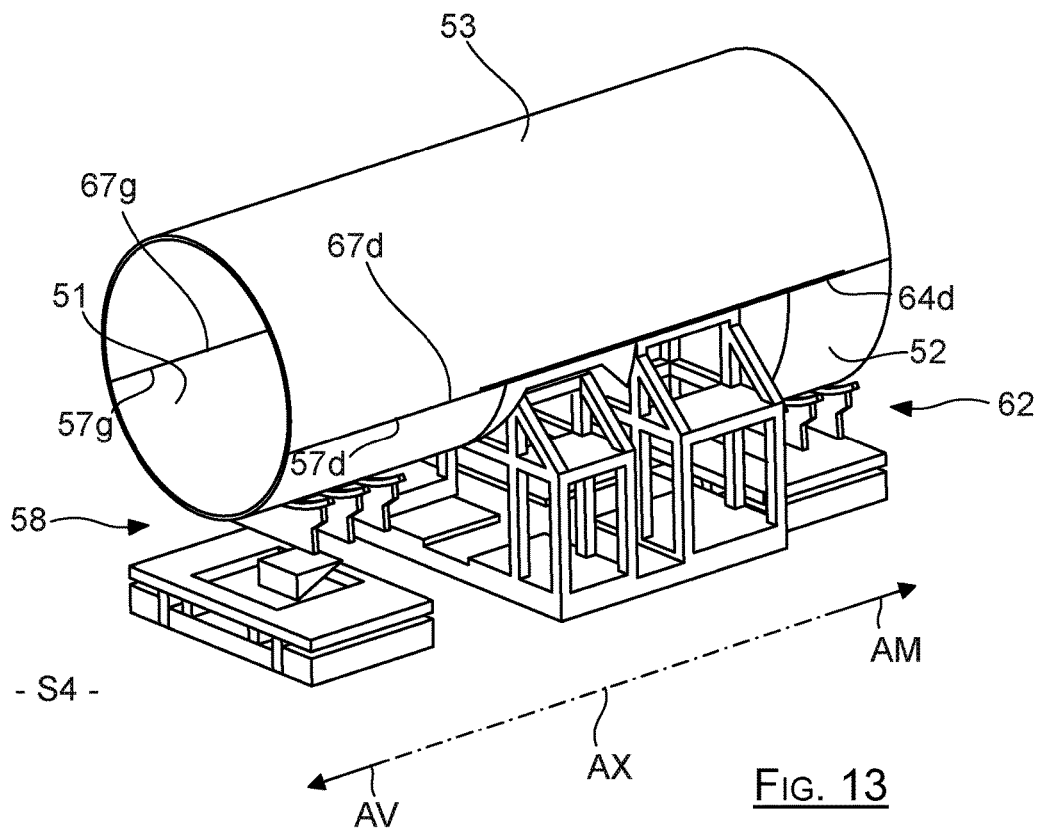
FIG. 13 is an overview of the trolley according to the disclosure herein upon the addition of an upper portion of fuselage skin.

As can be seen in FIGS. 12 and 13, the skin of the fuselage here comprises a downstream lower portion 51, an upstream lower portion 52, and an upper portion 53.

Each skin portion has an approximately semicylindrical form, the downstream lower portion 51 has a length corresponding approximately to a third of the length of the fuselage section, and the upstream lower portion 52 has a length corresponding approximately to a quarter of the length of the fuselage. The upper portion 53 has a length corresponding approximately to the length of the fuselage section.

When the rolling trolley 1 is in place and immobilized in the station S4, the downstream portion 51 of fuselage skin is brought to and placed in its reference position.

In this reference position, the semicircular upstream scalloped edge 54 of the downstream portion 51 runs along the semicircular lower scalloped edge 56 of the downstream wall 21, the left upper rectilinear edge 57g of the downstream portion 51 extends in the extension of the left spar 39g, and the right upper rectilinear edge 57d of the downstream portion 51 extends in the extension of the right spar 39d. In other words, the upper edges 57g and 57d of the downstream portion 51 are at the same height as the spars 39g and 39d and the downstream cross-beam 46 extends both between the downstream ends of the spars 39g and 39d and between the upstream ends of the upper edges 57g and 57d.

As can be seen in FIG. 12, the downstream portion 51 is supported by a dedicated rolling lift support, identified by the reference 58, allowing the downstream portion 51 both to be provided to the station S4, and for it to be positioned with precision with respect to the framework already assembled. This rolling lift support 58 more particularly comprises a bed-plate 59 supporting, on the one hand, its motorized rolling elements, and, on the other hand, an active supporting structure 61.

This active supporting structure 61 comprises a controllable foot for adjusting its height with respect to the bed-plate, this foot and a set of controllable motorized supporting castors receiving the semicylindrical downstream lower portion 51. Thus, the control of the bearing castors makes it possible to pivot the downstream portion 51 on itself to position its two upper edges 57g and 57d at the same height, and the control of the foot makes it possible to place these edges at the same height as the spars 39g and 39d.

Similarly, the upstream portion 52 is brought to and positioned by another rolling lift support 62, having a general structure of the same type as the rolling lift support 58. It is positioned, as illustrated in FIG. 12, that is to say upstream of the upstream wall 23 with its scalloped downstream edge 63 which runs along the scalloped lower edge 64 of the upstream wall 23, and its upper rectilinear edges 64g and 64d at the same level and extending in the extension of the spars 39g and 39d.

In other words, the upper edges 64g and 64d of the upstream portion 52 are at the same height as the spars 39g and 39d, and the upstream cross-beam 48 extends both between the upstream ends of the spars 39g and 39d and between the upstream ends of the upper edges 64g and 64d.

At this stage, the upper portion 53 is suspended from a traveling gantry crane, identified by the reference 66 in FIG. 14, which is actuated to bring this upper portion 53 to the station S3 and to place it in its reference position.

In its reference position, corresponding to that of FIG. 13, the upper portion 53 forms, with the lower portions 51 and 52, a substantially tubular assembly corresponding to the fuselage and at least partially enclosing the framework assembled in the stations S1 to S3. As can be seen in this FIG. 13, the lower part of this fuselage section thus comprises an open portion crossed longitudinally by the master wall 9 and intended to receive the wings of the aircraft.

In this reference position, the upper portion 53 comprises two lower rectilinear edges 67g and 67d which respectively run along the upper rectilinear edges 57g and 57d of the downstream lower portion 51, the spars 39g and 39d, and the upper rectilinear edges 64g and 64d of the upstream lower portion 52.

Once the assembly is in place, the left joint is made, that is to say the fixing of the edge 67g to the edge 57g, to the spar 39g, and to the edge 64g. Likewise, the right joint is made, that is to say the fixing of the edge 67d to the edge 57d, to the spar 39d, and to the edge 64d.

Station S5—Removal of the Trolley

When the assembly of the fuselage section has been constructed, which corresponds to the situation of FIG. 13, the assembly is transferred to another station, identified by the reference S5, for the removal of the trolley.

More particularly, the assembly conveyed to the station S5 then comprises the trolley 1 supporting the assembly by its central part by the master wall 9, and the rolling lift supports 58 and 62 which support the assembly by its upstream portion and its downstream portion.

Once the assembly is in place in the station S5, the longitudinal master wall 9 is mechanically released and separated from the supporting structure 3. At this stage, the assembly of the fuselage section is no longer supported by the trolley 1, but by the rolling supports 58 and 62. The right modules 5 and 6 of the structure 3 of the trolley 1 can then be dismantled to be removed from the bed-plate 2 of this trolley, which then allows the trolley 1 to be moved to the left to remove it from the assembly.

The assembly of the fuselage section can then be moved to another location on the assembly site, for example to perform supplementary operations then proceed with the assembly of this fuselage section with the other sections of the fuselage which have been previously assembled.

As can be seen in FIG. 14, the various stations S1 to S5 can be aligned along a pair of guiding rails installed on the ground of the production site, and along which the trolley is moved to pass from one station to another. This, among other things, makes it possible to automatically ensure a transverse positioning of the trolley when it reaches a station.

Each station is equipped with a variety of manual, automatic or semi-automatic equipment. Such equipment makes it possible to ensure, on the one hand, the operations providing the components to be fixed to the framework supported by the trolley, on the other hand the operations of adjusting the position of each component, and finally the operations of fixing each component to the framework of the fuselage section supported by the trolley. More generally, the assembly of the fuselage section is performed automatically, semi-automatically, and/or manually.

A switch is also advantageously inserted between each station so as to facilitate the provision of components by other rolling structure not represented in the figures.

In the example which has been described, the trolley 1, which can move around on the ground, is a rolling trolley comprising, for example, motorized wheels, but it can also be a trolley equipped with an air cushion system or the like to allow it to move around on the ground with the least possible friction.

Generally, in all the assembly operations performed on the various stations, the fixing of one element to another is done, depending on the case, by bolting, by riveting, by welding, by bonding, by polymerization, or other such means. In other words, the fixing method used depends on the materials used, on the accessibility, and on a set of constraints linked to the design of the fuselage.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assembling a central aircraft fuselage section, the section comprising a longitudinal master wall for fixing of two wing boxes of the aircraft, the method comprising:
   supplying a trolley that can move around on ground, the trolley comprising a supporting structure, and positioning the trolley in an assembly station;
   providing the assembly station with the master wall, installing and mechanically immobilizing the master wall in a reference position on the supporting structure of the trolley;
   providing the assembly station with a transverse wall, installing and mechanically immobilizing the transverse wall in a reference position with respect to the trolley, in which the transverse wall is situated with respect to the master wall in position to be secured with the master wall;
   fixing the transverse wall to the master wall; and
   moving the trolley to another assembly station.

2. The method of claim 1,
   wherein the transverse wall provided to the assembly station is borne by a traveling gantry crane to which the transverse wall is fixed, and
   in which the installation and the mechanical immobilizing of the transverse wall in a reference position are ensured by placing and by immobilizing the traveling gantry crane in a predetermined position with respect to the trolley.

3. The method of claim 1, comprising:
   providing the assembly station with a left part of a median transverse wall, installing and mechanically immobilizing the left part in a reference position, in which it extends at right angles to the longitudinal master wall at substantially mid-length of the longitudinal master wall by having an internal edge running along a left face of the longitudinal master wall;
   fixing the left part to the longitudinal master wall;
   providing the assembly station with a right part of a median transverse wall, installing and mechanically immobilizing the right part in a reference position, in which it extends at right angles to the longitudinal master wall at substantially mid-length of the longitudinal master wall by having an internal edge running along a left face of the longitudinal master wall;
   fixing the right part to the longitudinal master wall; and
   moving the trolley to another assembly station.

4. The method of claim 3, comprising:
   providing the assembly station with a left spar and a right spar, installing and mechanically immobilizing each spar in a reference position with respect to the trolley, in which each spar extends on an upper edge of each transverse wall;
   fixing each spar to the transverse walls; and
   moving the trolley to another assembly station.

5. The method of claim 4, comprising:
   providing the assembly station with a left apron and a right apron,
   installing and mechanically immobilizing each apron in a reference position with respect to the trolley,
   in which each apron extends along the left spar or the right spar, between two transverse walls; and
   fixing each apron to the left spar or the right spar and to at least one transverse wall.

6. The method of claim 4, comprising:
providing the assembly station with cross-beams,
installing and mechanically immobilizing each cross-beam in a reference position with respect to the trolley, each cross-beam extending from the left spar to the right spar when in the reference position;
fixing each cross-beam to the left and right spars; and
moving the trolley to another station.

7. The method of claim 6, comprising:
providing the assembly station with transverse girders, installing and mechanically immobilizing each girder in a reference position with respect to the trolley, each girder extending from one spar to the other when it is in its reference position;
fixing each girder to the spars; and
moving the trolley to another station.

8. The method of claim 4, comprising:
providing the assembly station with a substantially semi-cylindrical downstream lower portion of fuselage skin, and
positioning and immobilizing the downstream lower portion in a reference position with respect to the trolley,
the downstream lower portion extending downstream from the transverse wall in the reference position,
the downstream lower portion comprising two upper rectilinear edges extending,
respectively,
in an extension of the left and right spars when in the reference position;
providing the assembly station with a substantially semi-cylindrical upstream lower portion of fuselage skin, and
positioning and immobilizing the upstream lower portion in a reference position with respect to the trolley,
the upstream lower portion extending upstream from an upstream transverse wall in a reference position,
the upstream lower portion comprising two upper rectilinear edges extending, respectively, in an extension of the left and right spars when in the reference position;
providing the assembly station with a substantially semi-cylindrical upper portion of fuselage skin, and
positioning and immobilizing the upper portion in a reference position with respect to the trolley,
the upper portion extending above the downstream lower portion and above the upstream lower portion to form a substantially cylindrical assembly in the reference position,
the upper portion comprising two lower rectilinear edges extending, respectively, in an extension of the left and right spars by being contiguous with the upper edges of the upstream and downstream lower portions, respectively, in reference position; and
fixing the upper edges of the upstream and downstream lower portions, respectively, to the lower edges of the upper portion.

9. The method of claim 1, wherein the fixings are ensured by bolting, riveting, welding, bonding, or polymerization.

10. The method of claim 1,
wherein a mobile trolley of rolling type with motorized wheels.

11. The method of claim 10, wherein guiding rails are provided fixed to the ground to control movements of the trolley.

* * * * *